United States Patent
Yamada

[11] Patent Number: 5,617,255
[45] Date of Patent: Apr. 1, 1997

[54] CAMERA LENS SYSTEM

[75] Inventor: Hiroshi Yamada, Saitama-ken, Japan

[73] Assignee: Fuji Photo Optical Co., Ltd., Saitama-ken, Japan

[21] Appl. No.: 356,586

[22] Filed: Dec. 15, 1994

[30] Foreign Application Priority Data

Dec. 15, 1993 [JP] Japan ................................. 5-314650

[51] Int. Cl.$^6$ .................................................... G02B 9/12
[52] U.S. Cl. ................................................. 359/784
[58] Field of Search .................... 359/661, 663, 359/784, 791, 793, 794, 691, 692, 797

[56] References Cited

U.S. PATENT DOCUMENTS 12,420  5/1992  Martin .
2,855,824  10/1958  Schade ......................... 359/663

Primary Examiner—Georgia Y. Epps
Assistant Examiner—Dawn-Marie Bey
Attorney, Agent, or Firm—Sixbey Friedman Leedom & Ferguson; Gerald J. Ferguson, Jr.; Evan R. Smith

[57] ABSTRACT

A camera lens system consists of first to third lens elements arranged in this order from the object side. The first lens element is a meniscus lens having a weak refractive power and concave toward the object side, the second lens element is a lens having a positive refractive power and the third lens element is a lens having a negative refractive power. A stop or an assumed stop is disposed close to the object side end of the lens system or on the object side of the same formula $v_3 \leq 40$ is satisfied wherein $v_3$ represents the Abbe's number of the third lens element.

8 Claims, 6 Drawing Sheets

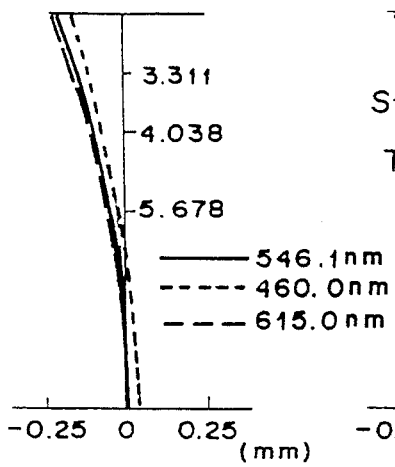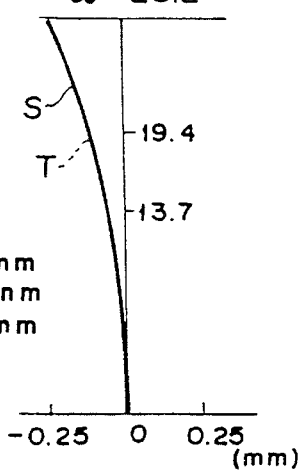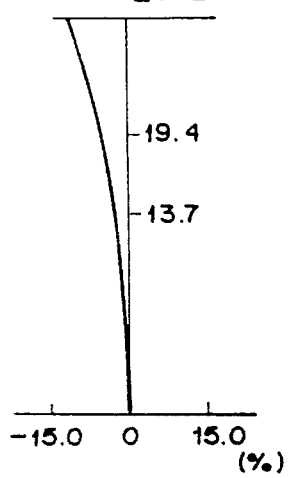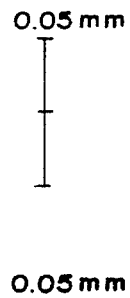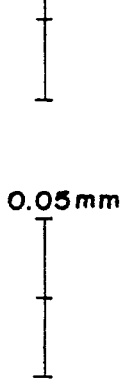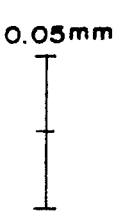

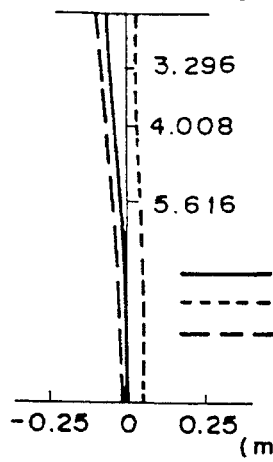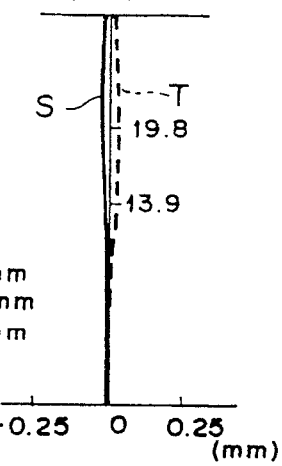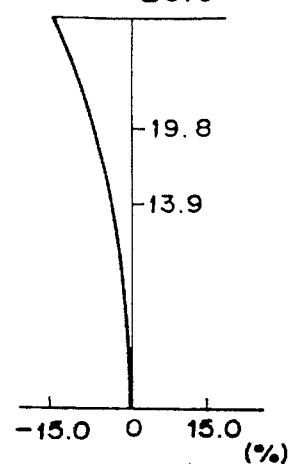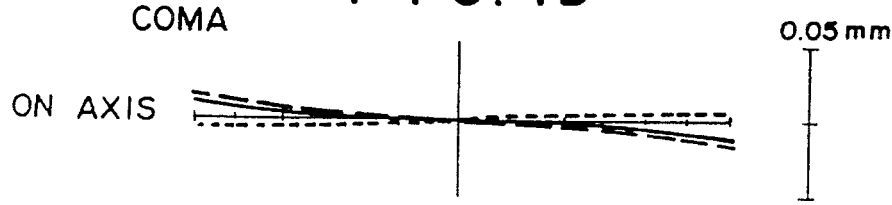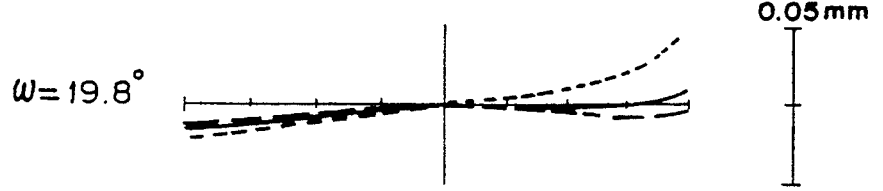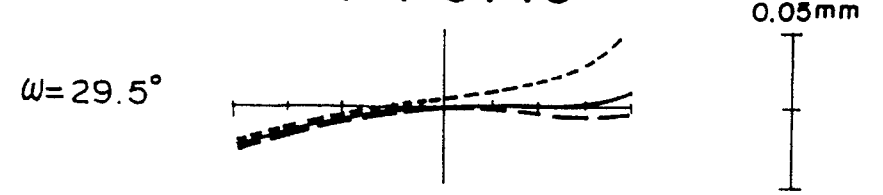

SPHERICAL ABERRATION
FNo=2.800

ASTIGMATISM
ω=30.5°

DISTORTION
ω=30.5°

COMA
ON AXIS

ω=14.0°

ω=20.1°

ω=30.5°

CAMERA LENS SYSTEM

BACKGROUND OF THE INVENTION

1. Field of the Invention

This invention relates to a lens system consisting of three lens elements, and more particularly to a lens system which consists of three lens elements and is suitable for use as an image pick up lens system for a video camera or a still-video camera for a visual phone, a door phone, monitoring or the like.

2. Description of the Prior Art

Recently a solid state image pickup device has been in wide use in various video cameras or still-video cameras. The solid state image pickup device has been made smaller year by year and accordingly there has been a demand for miniaturization of the lens system and for reduction in cost of the lens system.

In video cameras and still-video cameras, a low-pass filter for avoiding moiré patterns, an infrared cut filter for correcting the spectral sensitivity of the solid state image pickup device and/or a cover glass for protecting the image surface of the image pickup device are generally disposed between the lens system and the solid state image pickup device. In such a case, the lens system should have a long back focal length in order to accommodate such optical elements.

Recently there has been put into practice a solid state image pickup device in which a micro convex lens is disposed in front of each light receiving element of the solid state image pickup device in order to accumulate a light bundle travelling toward the dead zone of the element to the sensitive zone of the element, thereby increasing the sensitivity of the solid state image pickup device. When the light bundle entering such a solid state image pickup device largely inclines with respect to the optical axis of the micro lens, a so-called eclipse occurs at the aperture of the micro lens and a part of the incident light cannot reach the light receiving element. As a result, the brightness of the image becomes poor in the peripheral portion of the image and the peripheral portion of the image becomes dark. In order to avoid such a phenomenon, the incident angle of the incident light bundle to the solid state image pickup device should be as small as possible and it is necessary to position the exit pupil of the lens system as far from the image plane as possible.

In our Japanese Patent Application No. 5(1993)-314649, there is disclosed a two-lens image pickup lens system for a video camera or a still-video camera. The lens system comprises a meniscus lens element having a negative refractive power and a lens element having a positive refractive power and satisfies a predetermined condition. This lens system is long in the back focal length, clear and relatively wide in the angle of view and at the same time is small in size. However in the lens system, the incident angle of the incident light bundle to the solid state image pickup device is large and an eclipse occurs at the aperture of the micro lens when this lens system is used with a solid state image pickup device with micro lenses.

Further when the exit pupil of an image pickup lens system is positioned far from the image plane, correction of chromatic aberration becomes difficult.

SUMMARY OF THE INVENTION

In view of the foregoing observations and description, the primary object of the present invention is to provide a three-lens image pickup lens system which has a long back focal length, can be relatively large in angle of view, is clear, is small in size and at the same time is excellent in chromatic aberration.

The lens system in accordance with the present invention comprises first to third lens elements arranged in this order from the object side. The first lens element is a meniscus lens having a weak refractive power and concave toward the object side, the second lens element is a lens having a positive refractive power and the third lens element is a lens having a negative refractive power. A stop or an assumed stop is disposed close to the object side end of the lens system or on the object side of the same. Formula $v_3 \leq 40$ is satisfied wherein $v_3$ represents the Abbe's number of the third lens element.

In the lens system of the present invention, since the stop or the assumed stop is disposed close to the object side end of the lens system or on the object side of the same, the exit pupil of the lens system can be positioned far from the image plane and the incident angle of the incident light bundle to the solid state image pickup device can be small, whereby any eclipse in a solid state image pickup device with micro lenses can be prevented and shortage of the amount of light in the peripheral portion of the image can be prevented.

Further since the first lens is a meniscus lens having a weak refractive power and concave toward the object side, the principal point on the image plane side is kept far from the object and accordingly the back focal length of the lens system can be long. The concave face of the first lens facing toward the object erects the image plane which is inclined under by the second lens element which is a convex lens. Though the distortion of the lens system becomes under due to the concave face of the first lens element, it practically gives rise to no problem when the half angle of view is about 29°.

The above formula limits the value of the Abbe's number of the third lens. That is, when the Abbe's number of the third lens is not larger than 40, longitudinal chromatic aberration, which is apt to become large when the exit pupil of the lens system is positioned far from the image plane, can be suppressed.

DESCRIPTION OF THE PREFERRED EMBODIMENTS

Figure 1:
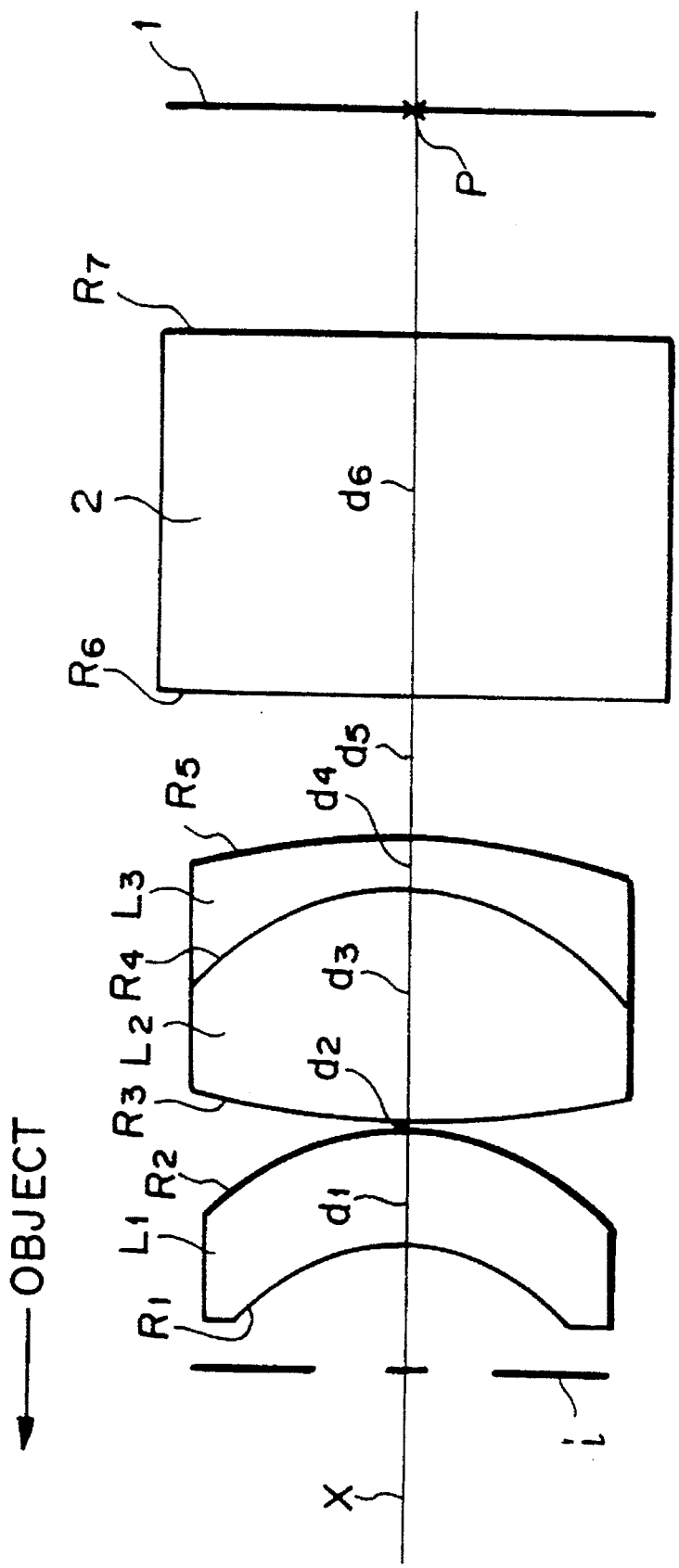
FIG. 1 is a schematic cross-sectional view showing the arrangement of the lens elements in lens systems in accordance with first and second embodiments of the present invention.

As shown in FIG. 1, each of the lens systems in accordance with the first and second embodiments of the present invention comprises first third lens elements $L_1$ to $L_3$ arranged in this order from the object side. A low-pass filter 2 is disposed between the third lens element $L_3$ and a solid state image pickup device 1. A stop i is disposed close to the object side end of the first lens element $L_1$ or on the object side of the same. Light entering the taking lens system along the optical axis X is focused on an imaging position P of the solid state image pickup device 1.

The first lens element $L_1$ is a meniscus lens having a weak refractive power and concave toward the object side. The second lens element $L_2$ is a double-convex lens having a positive refractive power and is positioned so that its face of greater curvature is faced toward the image plane. The third lens element $L_3$ is a meniscus lens having a negative refractive power and concave toward the object side.

In the first and second embodiments, the second and third lens elements 52 and $L_3$ are cemented together.

Figure 2:
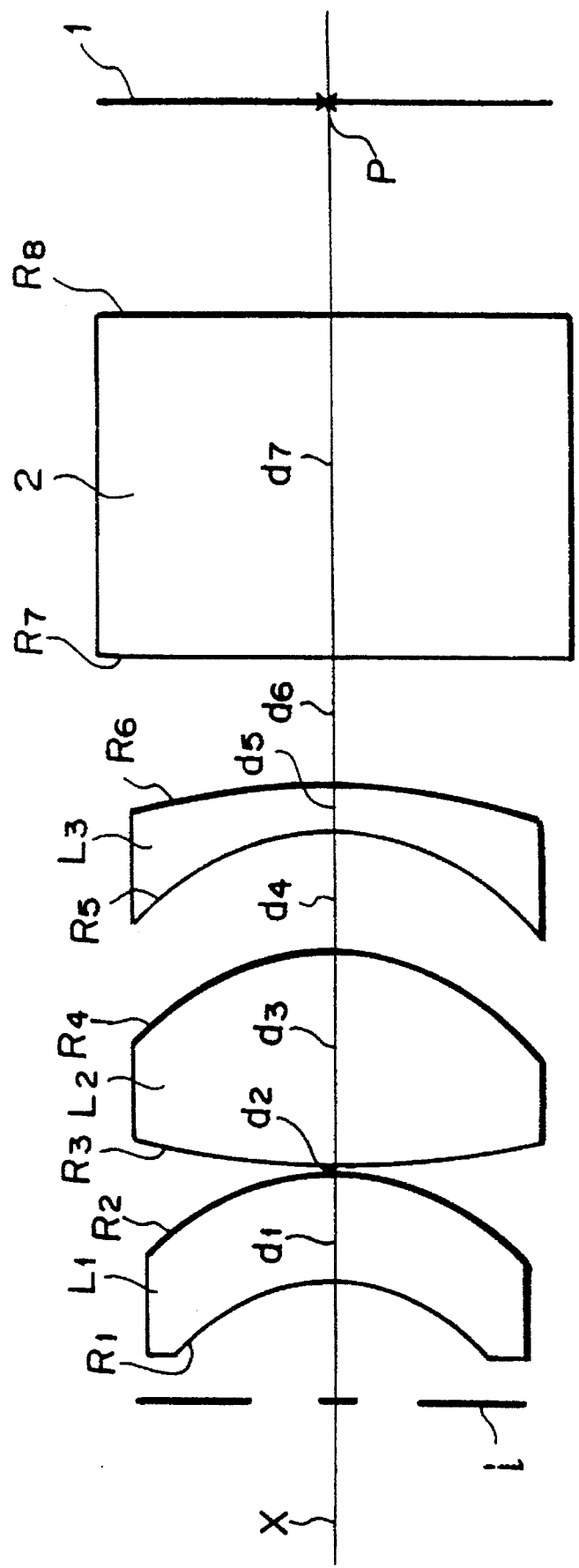
FIG. 2 is a schematic cross-sectional view showing the arrangement of the lens elements in lens systems in accordance with a third embodiment of the present invention, FIGS. 3A to 3G respectively show spherical aberration, astigmatism, distortion and comas for "on axis", "ω=13.7°", "ω=19.4°", and "ω=28.2°" of the lens system in accordance with the first embodiment of the present invention, FIGS. 4A to 4G respectively show spherical aberration, astigmatism, distortion and comas for "on axis", "ω=13.9°", "ω=19.8°", and "ω=29.5°" of the taking lens system in accordance with the second embodiment of the present invention, FIGS. 5A to 5G respectively show spherical aberration, astigmatism, distortion and comas for "on axis", "ω=14.0°", "ω=20.1°", and "ω=30.5°" of the taking lens system in accordance with the third embodiment of the present invention.
Figure 5A:
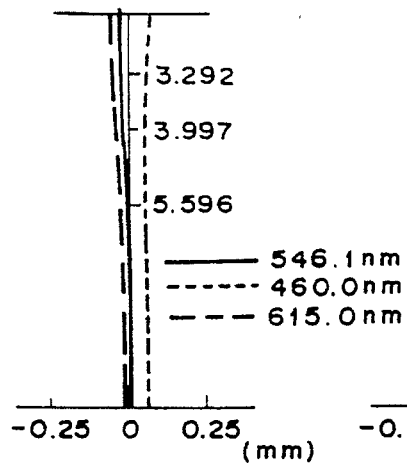
Figure 5B:
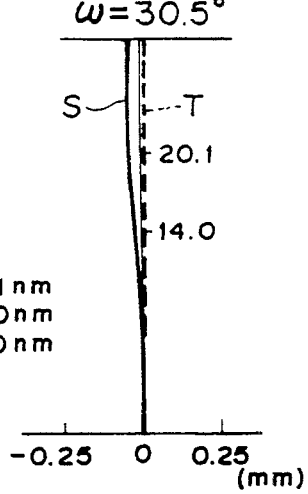
Figure 5C:
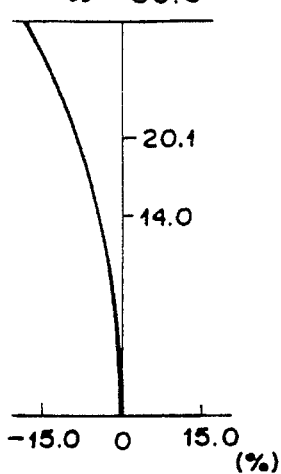
Figure 5D:
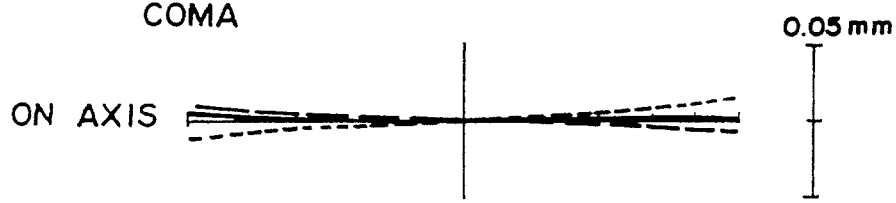
Figure 5E:
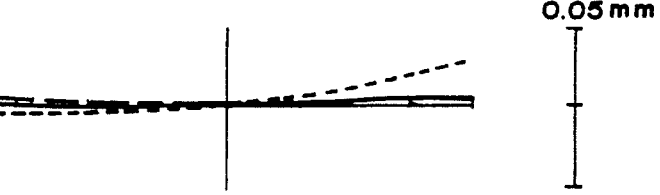
Figure 5F:
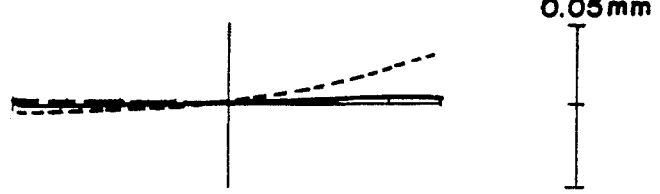
Figure 5G:

As shown in FIG. 2, the lens system of the third embodiment is substantially the same as those of the first and second embodiments in the arrangement of the lens elements except that the second and third lens elements $L_2$ and $L_3$ are spaced from each other.

Each of the lens systems satisfies the formula $v_3 \leq 40$ wherein $v_3$ represents the Abbe's number of the third lens element.

The radii of curvature R(mm) of the refracting surfaces, the axial surface separations d (mm) (the central thicknesses of the lenses or the air separations), the refractive indexes n for the e-line of the lenses and the Abbe's numbers v of the lenses of the lens systems in accordance with the first to third embodiments are as shown in tables 1 to 3, respectively. In tables 1 and 2, the radii of curvature of the refracting surfaces, the axial surface separations, the refractive indexes for the e-line and the Abbe's numbers of the lenses are designated in order from the object side at $R_1$ to $R_7$, $d_1$ to $d_6$, $n_1$ to $n_4$ and $v_1$ to $v_4$. In table 3, the radii of curvature of the refracting surfaces, the axial surface separations, the refractive indexes for the e-line and the Abbe's numbers of the lenses are designated in order from the object side at $R_1$ to $R_8$, $d_1$ to $d_7$, $n_1$ to $n_4$ and $v_1$ to $v_4$.

TABLE 1

| radius of curvature R | axial surface separation d | refracting index n | Abbe's number v |
|---|---|---|---|
| $R_1 = -2.727$ | $d_1 = 1.25$ | $n_1 = 1.80831$ | $v_1 = 46.5$ |
| $R_2 = -3.295$ | $d_2 = 0.10$ | | |
| $R_3 = 11.103$ | $d_3 = 2.83$ | $n_2 = 1.77621$ | $v_2 = 49.6$ |
| $R_4 = -3.200$ | $d_4 = 0.55$ | $n_3 = 1.85505$ | $v_3 = 23.8$ |
| $R_5 = -8.876$ | $d_5 = 2.30$ | | |
| $R_6 = \infty$ | $d_6 = 4.30$ | $n_4 = 1.51824$ | $v_4 = 64.0$ |
| $R_7 = \infty$ | | | |

In the first embodiment, the focal length f of the overall lens system is 6.31 mm, the back focal length is 6.66 mm and $d_1/f$ is 0.20, $d_1$ representing the central thickness of the first lens element $L_1$. Further the F number and the half angle of view ω are 2.8 and 28.2°, respectively. The stop i is at a distance of 1.57 mm from the object side face of the first lens element $L_1$ toward the object and the exit pupil is at a distance of 17.6 mm from the imaging position P toward the object.

TABLE 2

| radius of curvature R | axial surface separation d | refracting index n | Abbe's number v |
|---|---|---|---|
| $R_1 = -4.277$ | $d_1 = 5.00$ | $n_1 = 1.80831$ | $v_1 = 46.5$ |
| $R_2 = -6.550$ | $d_2 = 0.10$ | | |
| $R_3 = 9.236$ | $d_3 = 2.83$ | $n_2 = 1.77621$ | $v_2 = 49.6$ |
| $R_4 = -4.001$ | $d_4 = 0.55$ | $n_3 = 1.85505$ | $v_3 = 23.8$ |
| $R_5 = -18.805$ | $d_5 = 3.80$ | | |
| $R_6 = \infty$ | $d_6 = 4.30$ | $n_4 = 1.51824$ | $v_4 = 64.0$ |
| $R_7 = \infty$ | | | |

In the second embodiment, the focal length f of the overall lens system is 6.27 mm, the back focal length is 8.17 mm and $d_1/f$ is 0.8, $d_1$ representing the central thickness of the first lens element $L_1$. Further the F number and the half angle of view ω are 2.8 and 29.5°, respectively. The stop i is at a distance of 0.1 mm from the object side face of the first lens element $L_1$ toward the image plane and the exit pupil is at a distance of 18.4 mm from the imaging position P toward the object.

TABLE 3

| radius of curvature R | axial surface separation d | refracting index n | Abbe's number v |
|---|---|---|---|
| $R_1 = -6.490$ | $d_1 = 9.7$ | $n_1 = 1.80831$ | $v_1 = 46.5$ |
| $R_2 = -11.109$ | $d_2 = 0.1$ | | |
| $R_3 = 9.024$ | $d_3 = 3.6$ | $n_2 = 1.77621$ | $v_2 = 49.6$ |
| $R_4 = -4.491$ | $d_4 = 0.005$ | | |
| $R_5 = -4.489$ | $d_5 = 0.55$ | $n_3 = 1.85505$ | $v_3 = 23.8$ |
| $R_6 = -15.944$ | $d_6 = 4.30$ | | |
| $R_7 = \infty$ | $d_7 = 4.30$ | $n_4 = 1.51824$ | $v_4 = 64.0$ |
| $R_8 = \infty$ | | | |

In the third embodiment, the focal length f of the overall lens system is 6.26 mm, the back focal length is 8.66 mm and $d_1/f$ is 1.55, $d_1$ representing the central thickness of the first lens element $L_1$. Further the F number and the half angle of view ω are 2.8° and 30.5°, respectively. The stop i is at a distance of 1.48 mm from the object side face of the first lens element $L_1$ toward the image plane and the exit pupil is at a distance of 22.5 mm from the imaging position P toward the object.

FIGS. 3A to 3G, FIGS. 4A to 4G and FIGS. 5A to 5G respectively show various aberrations of the lens systems of the first to third embodiments.

As can be understood from FIGS. 3A to 3G, FIGS. 4A to 4G and FIGS. 5A to 5G, the lens system of each embodiment is excellent in aberrations.

In the lens system of each embodiment, the exit pupil is relatively far from the image plane and since the Abbe's number of the third lens element $L_3$ is not larger than 40, the longitudinal chromatic aberration can be made small. Further, the lens system of each embodiment has a long back focal length and a wide half angle of view ω (as wide as about 29°) and is clear (F number is 2.8). At the same time, the lens system of each embodiment is small in size and can be manufactured at low cost.

The arrangement of the lens system in accordance with the present invention need not be limited to those described above in conjunction with the first to third embodiments, but the radius of curvature of each lens element, the axial surface separations (including the thickness of the lens elements) and the like may be variously modified without departing from the spirit and scope of the invention.

Figure 6:
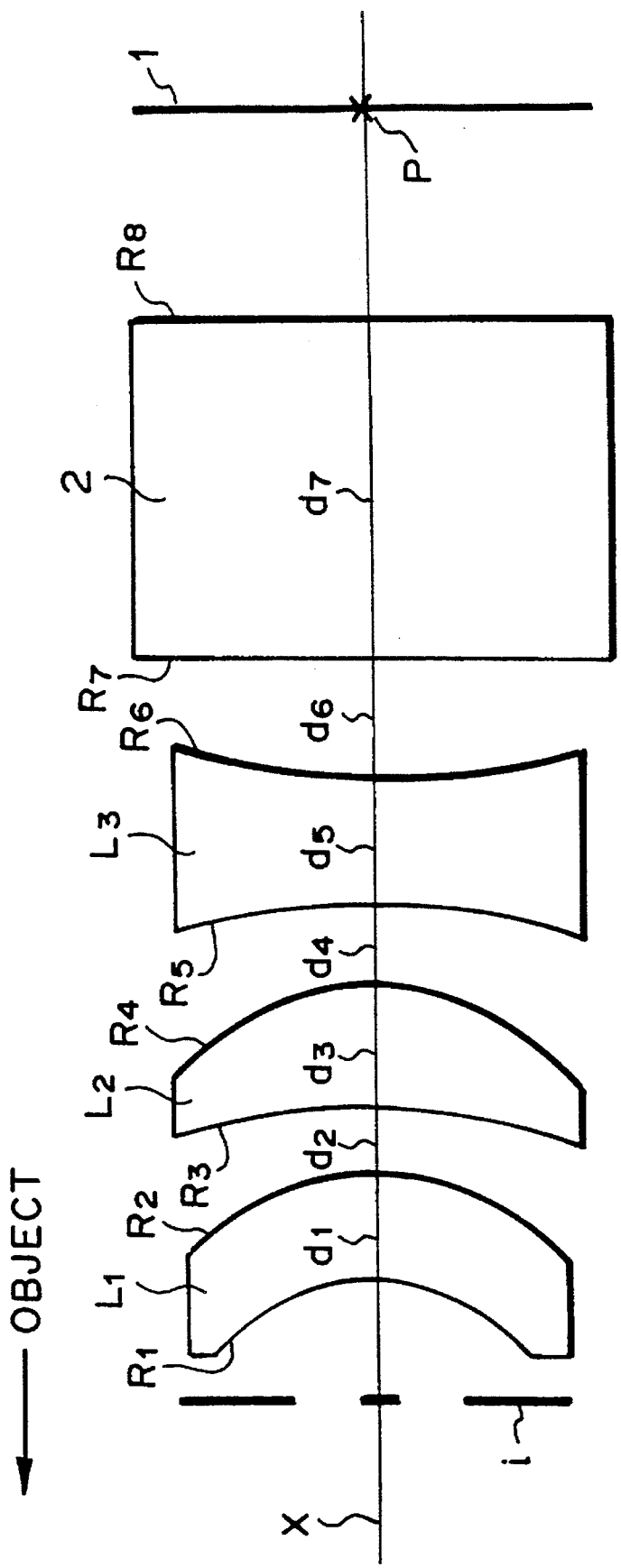
FIG. 6 is a schematic cross-sectional view showing the arrangement of the lens elements in another embodiment of the invention.

For example, the second lens element $L_2$ may be a meniscus lens having a positive refractive power and the third lens element $L_3$ may be a double-concave lens (see FIG. 6).

Instead of the low-pass filter employed in the embodiments described above or in addition to the low-pass filter, an infrared cut filter and/or a cover glass may be inserted between the lens system and the solid state image pickup device.

As can be understood from the description above, in the lens system of the present invention, the incident angle of the incident light bundle to the solid state image pickup device can be small and the longitudinal chromatic aberration can be excellent. Further the lens system of the present invention is long in the back focal length, relatively wide in the half angle of view, clear and small in size and can be manufactured at low cost. Accordingly, the lens system of the present invention is suitable as the image pick up lens for various video cameras and still-video cameras.

What is claimed is:

1. A lens system consisting of first to third lens elements arranged in this order from the object side to an image plane, the first lens element being a meniscus lens having a refractive power and concave toward the object side, the second lens element being a lens having a positive refractive lower and the third lens element being a lens having a negative refractive lower, wherein a stop means for adjusting an aperture of the lens system is disposed on the object side and formula $v_3 \leq 40$ is satisfied wherein $v_3$ represents the Abbe's number of the third lens element.

2. The lens system of claim 1 wherein the second lens element is a double convex lens.

3. The lens system of claim 2 wherein the third lens element is a meniscus lens having a negative refractive power and concave toward the object side.

4. The lens system of claim 3 wherein the second and third lens elements are fixed to each other.

5. The lens system of claim 1 wherein the second lens element is a meniscus lens having a positive refractive power.

6. The lens system of claim 5 wherein the third lens element is a double concave lens.

7. The lens system of claim 1 further comprising one of an infrared cut filter, a cover glass, and a low pass filter, located between the third lens element and the image plane.

8. The lens system of claim 1 further comprising a low pass filter and a solid state image pickup at the image plane, said low pass filter located between the third lens and the solid state image pickup.

* * * * *